US009649794B2

(12) United States Patent
Prieto Goubert et al.

(10) Patent No.: US 9,649,794 B2
(45) Date of Patent: May 16, 2017

(54) CONTAINER MODIFICATIONS TO MINIMIZE DEFECTS DURING REACTIVE POLYURETHANE FLOW

(71) Applicant: Dow Global Technologies LLC, Midland, MI (US)

(72) Inventors: Miguel A. Prieto Goubert, Richterswill (CH); Adrian J. Birch, Kempraten-Jona (CH); Luis G. Zalamea, Richterswill (CH); Hans Kramer, Kempraten-Jona (CH)

(73) Assignee: Dow Global Technologies, Midland, MI (US)

( * ) Notice: Subject to any disclaimer, the term of this patent is extended or adjusted under 35 U.S.C. 154(b) by 0 days.

(21) Appl. No.: 15/041,105

(22) Filed: Feb. 11, 2016

(65) Prior Publication Data

US 2016/0207231 A1 Jul. 21, 2016

Related U.S. Application Data

(63) Continuation of application No. 13/818,130, filed as application No. PCT/US2011/054116 on Sep. 30, 2011, now abandoned.

(60) Provisional application No. 61/388,189, filed on Sep. 30, 2010.

(51) Int. Cl.
| | |
|---|---|
| *B29C 44/12* | (2006.01) |
| *B29C 44/14* | (2006.01) |
| *B29C 44/34* | (2006.01) |
| *B29C 44/18* | (2006.01) |
| *B29D 22/00* | (2006.01) |
| *B29L 31/00* | (2006.01) |
| *B29K 75/00* | (2006.01) |

(52) U.S. Cl.
CPC .......... *B29C 44/1214* (2013.01); *B29C 44/14* (2013.01); *B29C 44/18* (2013.01); *B29C 44/3403* (2013.01); *B29C 44/355* (2013.01); *B29D 22/003* (2013.01); *B29K 2075/00* (2013.01); *B29K 2995/0015* (2013.01); *B29L 2031/712* (2013.01); *B29L 2031/7622* (2013.01)

(58) Field of Classification Search
None
See application file for complete search history.

(56) References Cited

U.S. PATENT DOCUMENTS

| | | | |
|---|---|---|---|
| 3,666,848 | A | 5/1972 | Harper et al. |
| 4,016,702 | A | 4/1977 | Nakada et al. |
| 4,156,045 | A | 5/1979 | Burger |
| 4,256,304 | A | 3/1981 | Smith et al. |
| 4,593,449 | A | 6/1986 | Meray-Hovarth et al. |
| 4,806,302 | A | 2/1989 | Frank |
| 5,009,952 | A | 4/1991 | Klepsch et al. |
| 6,190,755 | B1 | 2/2001 | Addeo et al. |
| 6,607,687 | B1 | 8/2003 | Okubo et al. |
| 2008/0255262 | A1 | 10/2008 | De Vos et al. |

FOREIGN PATENT DOCUMENTS

| | | |
|---|---|---|
| DE | 10154472 A1 | 5/2003 |
| EP | 1508437 A2 | 2/2005 |
| GB | 813311 A | 5/1959 |
| GB | 2143465 A | 2/1985 |
| JP | 52-056198 | 5/1977 |
| JP | 54-127976 | 4/1979 |
| JP | 56-161125 | 12/1981 |
| JP | 01-180332 A | 7/1989 |
| JP | 05-069448 | 3/1993 |
| JP | 06-171003 | 6/1994 |
| JP | 11-227084 | 8/1999 |
| JP | 2001-150461 | 6/2001 |
| JP | 2005-298760 A | 10/2005 |
| JP | 2006-044181 A | 2/2006 |
| JP | 2007-225708 A | 9/2007 |
| JP | 2007-260939 | 10/2007 |
| JP | 4198518 B2 | 12/2008 |

OTHER PUBLICATIONS

PCT/US2011/054116, International Search Report, 2012, pp. 1-7.
PCT/US2011/054116, International Preliminary Report on Patentability, 2013, pp. 1-13.
PCT/US2011/054116, Written Opinion of the International Searching Authority, 2012, pp. 1-12.

*Primary Examiner* — Benjamin Schiffman

(57) ABSTRACT

A method of reducing the number or size of voids in a polyurethane comprises reacting the formulation components in a container having an inner surface, or having a liner that has an inner surface, that has been modified to reduce the shear forces that normally accompany introduction of such components into a container. This is done by modifying the inner container's or container liner's surface by profiling and/or engraving it, or by including as a liner a mesh. The profiling and/or engraving or mesh serves to alter the formulation's flow dynamics such that the polyurethane has fewer and/or smaller voids, i.e., has a more uniform density, than polyurethanes formed without the modification.

15 Claims, No Drawings

CONTAINER MODIFICATIONS TO MINIMIZE DEFECTS DURING REACTIVE POLYURETHANE FLOW

BACKGROUND

1. Field of the Invention

The invention relates to the field of reactive polyurethane flows. More particularly, it relates to container modifications that reduce defects in polyurethanes formed by flowing reactants into the containers.

2. Background of the Art

Polyurethanes are widely employed to fill spaces and serve other purposes in structures. Examples may include their use in appliance walls, where they may contribute to provide insulation against heat or cold as well as structural strength; in automobiles, where they may provide insulation against noise, vibration, and/or fire; and in ship or boat hulls, where they may provide buoyancy. For these and other applications, it is common to introduce the polyurethane formulation's components into the space, for example, by injection thereof, and allow the components to react to form the final polyurethane therein. This method enables the polyurethane to simultaneously fill and take the desired final shape of the space. It is also often desirable that the polyurethane be as uniform as possible, having few and/or small voids therein, such that any of the desired roles of the polyurethane (e.g., structural strength, buoyancy, and/or insulation against heat, cold, noise, etc.) are not compromised.

Unfortunately, the processes by which the polyurethane is formed, e.g., injection, exerts or results in flow, of the components and/or of the forming (reacting) polyurethane, prior to the setting and subsequent curing thereof. During this time, and depending upon the viscosities of the flowing material(s), the overall reactivity of the formulation, and the method and rate of introduction of the components, there is often a tendency for voids to form. For example, use of vacuum-assisted injection methods (pressures of, e.g., 0.6 to 0.8 bar, 60 to 80 kPa) along with highly reactive foamed polyurethane formulations will usually greatly increase this tendency, because the shear stresses exerted along the walls of the container into which the components are introduced result in some destabilization of the forming foam. Voids include a variety of holes within and/or at the surface of the foam that differ from the overall desired structure of the polyurethane. Thus, if a polyurethane formulation is designed to produce a foamed polyurethane having foam cells, whether filled with air or with a blowing agent, of a particular average diameter range, voids are any cells or holes that have diameters that are significantly larger than the desired average diameters. If the formulation is designed to produce a non-foamed polyurethane, then voids are any significant voids that result in a significantly non-uniform cross-section.

In view of the fact that any non-uniformity in the polyurethane structure risks undesirable performance reduction and/or, at the least, cosmetic detraction, those skilled in the art continue to seek means and methods of reducing the occurrence and/or size of such voids. Furthermore, it is recognized that reductions in the occurrence and/or size of voids may enable corresponding reductions in the amount or thickness of the polyurethanes used, enabling lower costs without reduced performance, or increased performance without correspondingly increased costs.

SUMMARY OF THE INVENTION

In one aspect the invention provides a method of reducing the number or size of voids in a polyurethane formed in situ in a container, comprising forming a flow of at least two reactive polyurethane formulation components from a component source such that at least a portion of the flow contacts an inner surface of a container or of a liner thereof, the inner surface being (1) modified over at least 25 percent thereof by either (a) profiling features, said profiling features each having an average height-to-surface measurement ranging from 0.5 millimeter (mm) to 20 mm; or (b) engraving features, said engraving features having a depth-to-surface measurement ranging from 0.1 mm to 0.3 mm; the profiling or engraving features being repeated at intervals that range from 2 to 5 times the height-to-surface or depth-to-surface measurement, respectively; or (2) a mesh or having a mesh interposed between the inner surface and the component source, wherein the mesh has an average pore diameter ranging from 1 mm to 40 mm; under conditions such that a polyurethane is formed, the polyurethane having fewer or smaller voids than a polyurethane formed under identical conditions but without a modified inner surface.

In another aspect the invention provides an improvement in a method to form a polyurethane in situ in a container, wherein a flow of at least two reactive polyurethane formulation components into a container with an inner surface is initiated and the components react to form the polyurethane in the container, and wherein the flow exhibits dynamics that include shear forces resulting from the interaction of the flow and the inner surface, and wherein the polyurethane formed in the container from the formulation exhibits undesirable voids therein, the improvement comprising reducing the shear forces resulting from the interaction of the flow and the inner surface by (1) modifying the inner surface of the container or by inserting a liner having a modified inner surface into the container, such that the modification increases the area of the container or liner inner surface contacting the formulation by a factor of at least 25 percent compared to that of an otherwise identical container having an unmodified inner surface; or (2) wherein the liner is a mesh interposed between the inner surface and the component source, wherein the mesh has an average pore diameter ranging from 1 mm to 40 mm; such that the polyurethane exhibits voids that are fewer in number or smaller in average diameter, or both, than voids in a polyurethane formed identically but without the modified inner container or liner surface.

DETAILED DESCRIPTION OF THE EMBODIMENTS

The invention provides a convenient and low cost means and method whereby the uniformity of a polyurethane may be increased, particularly where the polyurethane is formed by flowing its reactive components against a surface, such as may be encountered when the polyurethane is formed within an enclosed or partially enclosed container. As used herein, the term "polyurethane" broadly includes true polyurethanes as well as polyureas, polyurethane-ureas, and variously modified polyurethanes such as carbodiimide-modified polyurethanes. Examples of containers comprehended hereby may include, but are not limited to, appliance interior and exterior walls and shelves; boat and ship hulls, compartment dividers, and other marine structures; vehicle and engine compartment dividers and modifiers; aircraft bodies and interior structures; helmets and other personal protective gear, especially athletic gear; sporting and recreational equipment, including but not limited to, for example, surfboards and campers; and electrical and electronics housings.

The invention provides a means and method of reducing the size and/or number of voids by effectively modifying the shear stresses and/or flow dynamics occurring at or near the container walls, regardless of the method, means, or rate of introduction of the polyurethane's reactive components. This may be accomplished in various ways. The first way described herein is to modify the inner surface of the container via "profiling" it. As the term is used herein, "profiling" means that the inner surface of the container is three-dimensional, rather than the two-dimensional, flat plane which the word "surface" generally implies. Instead, the invention employs an inner surface that has been roughened, textured, or shaped in such a way that it has topological features, hereinafter "profiling features," each having an average height-to-surface measurement of at least 0.5 mm, and preferably ranging from 1 mm to a maximum of 20 mm. As used herein the word "height" refers to the location of the profiling feature that is farthest removed from the closest point that is located directly upon the essentially flat plane, i.e., the feature that transforms the essentially two-dimensional, otherwise-smooth, flat plane into a three-dimensional, but still primarily planar, object. Another way to say this is that "profiling" comprehends whatever features provide variation to the inner surface's plane when viewed in cross-section, from essentially a straight vertical, horizontal, or diagonal line, to one that juts out in any of various but relatively minor ways toward the interior space where the polyurethane will be interposed, and which results in modification of the velocity field due to flow separation and the expanding character of the reactive polymer.

Because it is desirable to alter the flow of the components and/or the forming polyurethane throughout the space being filled, it is desirable that the profiling be repeated across a major proportion of the surface. In most embodiments it is desirable that at least 25 percent, preferably at least 30 percent, and more preferably at least 40 percent of the total inner surface area include the profiling, which means that any profile features, for example, a bump or ridge, be repeated sufficiently to cover at least that percentage of the total inner surface area. In further embodiments the added surface area will be at least 50, 60, 70, 80, 90, 100, 110, 120, 130, 140, 150 or even up to 300 percent greater surface area as compared to an inner surface of the container. Generally the increase in the surface area will be less than 290, 275, 250, 225 to less than 200 percent, as compared to a smooth inner liner.

Furthermore, it is desirable that such repeats of the profile features occur with a frequency that is from 2 to 5 times the average height-to-surface measurement of the feature. It will be understood by those skilled in the art that, depending upon the average diameter of the profile feature, the frequency will then automatically imply an average measurement of the intervals between the center points of the profile features.

For example, if the profile feature does not have a substantially circular base, then the measurement may be made edge to edge, e.g., in the case of a ridge, the distance from base on one side to base on the other side. This means, for example, that if the container's inner surface is profiled with bumps that average 1 mm in height, then these bumps are preferably repeated such that the intervals between the center points of the bumps range from 2 mm to 5 mm, and that therefore the diameter of the bumps themselves may correspondingly range from 2 mm to 5 mm (i.e., radii from 1 mm to 2.5 mm); and if the bumps are 5 mm-high, then the peak-to-peak (center point) intervals preferably range from 10 mm to 25 mm, enabling bump diameters from 10 mm to 25 mm (i.e., radii may be 5 mm to 12.5 mm). In the case of ridges, the peak-to-peak intervals and maximum thickness of the ridges to the inner surface's plane may be calculated in a corresponding manner.

It is important to note, however, that it is not necessary, though in some embodiments desirable, that the interval spaces, type of features, or height of features be uniform. Thus, for example, a very "rough" interior, having a variety of features types and a variety of height-to-surface measurements ranging from 0.5 mm to 20 mm or higher and no discernible pattern of features or of interval spaces between features, may be used herein. This embodiment may be particularly convenient and inexpensive as it may help to avoid the need for more expensive or inconvenient fabrication methods. For example, a chemical or mechanical means can be used to "roughen" the inner surface by scratching and/or etching it, hereinafter termed "engraving," to a desired degree. Because the potential for this may be particularly affected by the thickness of the container wall, a reduced range of feature measurement, ranging from 0.1 mm to 0.3 mm as the preferred depth-to-surface measurement, may be sufficiently effective to accomplish the goal of altering the flow dynamics. Those skilled in the art will be able to easily discern optimal means and methods to obtain the profiling in a given application with routine experimentation.

In another embodiment the invention may be carried out by including a "liner." In essence the liner serves the same purpose as the profiling of the inner surface, that is, it is designed to alter the flow of the polyurethane formulation components and/or forming polyurethane by altering the shear forces and/or the flow dynamics in general such that the incidence and/or size of voids is reduced. The liner is desirably positioned against or closely contiguous to the container's inner surface and, in certain preferred embodiments, covers a major part of the inner surface. In desirable embodiments it covers at least 70 percent of the inner surface; in more desirable embodiments at least 85 percent; and in most desirable embodiments, at least 95 percent. The liner may literally contact the surface, may be positioned very close to the surface, for example, within a distance up to 5 mm, or may include portions that contact the container's inner surface as well as portions that are positioned close to but do not touch the inner surface.

This liner may include a variety of configurations on its own inner surface. As defined herein, the liner's inner surface is the surface facing toward the majority of the space being filled, i.e., the cavity in the appliance wall, ship or boat hull, etc., where the polyurethane is to be primarily located. This means that the configuration includes profiling, i.e., modification to alter the flow of the polyurethane formulation's components during introduction and reaction to form the final polyurethane, such that voids, within the polyurethane or at its surface that is contiguous with the liner and/or container inner surface, are reduced, in number and/or size. Such configuration is not to be construed as including a flow-through mesh, but may represent a mesh-like profiling which disrupts shear forces but which does not allow any polyurethane formulation to actually flow through it, e.g., as if a mesh were positioned flat against a planar and non-perforated surface.

In still other embodiments the liner may be a mesh or have a mesh applied to. As used herein, the term "mesh" refers to a screen-type device that is made of metal or alloy, nylon or another thermoset polymer, a thermoplastic polymer such as polyethylene, an organic or inorganic woven or non-woven material, or any material capable of operating as a screen, i.e., of sufficient porosity, whereby some of the polyurethane intrudes through the spaces created between the material(s) making up the screen. Thus, the mesh serves to conveniently and effectively recreate the effect created by a "profiled" surface, i.e., alteration of the flow characteristics of the polyurethane components and/or of the reacting, forming polyurethane itself, i.e., it may change flow directions and reduce shear forces, and in addition may serve to help break up any forming voids. Where a mesh is used as a liner, it is, in certain particular embodiments, desirable that the mesh has an average pore diameter ranging from 1 mm to 40 mm. Such is more desirably from 10 mm to 30 mm, and most desirably from 15 mm to 25 mm.

In yet another embodiment of the invention the alteration of flow dynamics may be accomplished by simply interposing a mesh between the source of the formulation component flow and the container's inner surface, and flowing the components such that they contact the mesh before they contact the container's inner surface. This may be carried out in a number of ways. For example, the flow source may be positioned such that flow is perpendicular to the mesh, or at essentially any lesser angle, i.e., from 1 degree to 90 degrees. Thus, flow may be directed directly through the mesh prior to contacting the container's inner surface, such that essentially all of the components pass through it; against the mesh at an angle such that a portion of the components pass first through the mesh while a portion may never actually come into contact with the mesh; or a combination thereof. Those skilled in the art will be able to easily determine the optimal arrangement to achieve the desired quality improvement in the final polyurethane; however, in general it may be found that the closer the angle of flow is to perpendicular (90 degrees) to the mesh, the more important it may be to ensure that the mesh opening average diameter is less than the maximum size of allowable voids. For example, if the flow is perpendicular, and the maximum size of allowable voids is desirably 5 mm, then the average mesh opening diameter is desirably less than 5 mm; but if the flow is at a 45 degree angle to the mesh, then the average mesh opening may be larger than 5 mm, though preferably not significantly larger.

It is notable that, in addition to altering the flow dynamics of the polyurethane components and/or of the forming polyurethane, the use of the profiled container inner surface or the use of a profiled liner, may offer further benefits. One such benefit is that the final cured polyurethane may be better adhered to the container's inner surface than when the inner surface is neither profiled nor appropriately lined as described hereinabove. This feature may contribute to greater stability in the polyurethane and, therefore, in the structure wherein it is interposed. For example, greater adhesion may help to reduce shrinkage of the polyurethane over time, which may help to maintain the dimensions and strength of the structure as a whole.

The formulations for the polyurethane may include certain typical polyurethane components, and may optionally include a number of additives or other modifiers. The first is a polyisocyanate component. This is referred to in the United States as the "A-component" (in Europe, as the "B-component"). Selection of the A-component may be made from a wide variety of polyisocyanates, including but not limited to those which are well known to those skilled in the art. For example, organic polyisocyanates, modified polyisocyanates, isocyanate-based prepolymers, and mixtures thereof may be employed. These may further include aliphatic and cycloaliphatic isocyanates, and in particular aromatic, especially multifunctional aromatic isocyanates. Also particularly preferred are polyphenyl polymethylene polyisocyanates (PMDI).

Other polyisocyanates that may be useful in the present invention include 2,4- and 2,6-toluenediisocyanate and the corresponding isomeric mixtures; 4,4'-, 2,4'- and 2,2'-diphenyl-methanediisocyanate and the corresponding isomeric mixtures; mixtures of 4,4'-, 2,4'- and 2,2'-diphenyl-methane-diisocyanates and polyphenyl polymethylene polyisocyanates (PMDI); and mixtures of PMDI and toluene diisocyanates. Also useful for preparing the polyurethane layers of the present invention are aliphatic and cycloaliphatic isocyanate compounds such as 1,6-hexamethylene-diisocyanate; 1-isocyanato-3,5,5-trimethyl-1,3-isocyanatomethyl-cyclohexane; 2,4- and 2,6-hexahydro-toluene-diisocyanate, as well as the corresponding isomeric mixtures; 4,4'-, 2,2'- and 2,4'-dicyclohexylmethanediisocyanate, as well as the corresponding isomeric mixtures. Also useful is 1,3-tetramethylene xylene diisocyanate. In certain embodiments, however, the monomeric MDIs and mixtures thereof may not be preferred.

Also advantageously used for the A-component are the so-called modified multifunctional isocyanates, that is, products which are obtained through chemical reactions of the above diisocyanates and/or polyisocyanates. Exemplary are polyisocyanates containing esters, ureas, biurets, allophanates and, preferably, carbodiimides and/or uretonomines, and isocyanurate and/or urethane group containing diisocyanates or polyisocyanates. Liquid polyisocyanates containing carbodiimide groups, uretonomine groups and/or isocyanurate rings, having isocyanate group (NCO) contents of from 15 to 50 weight percent, more preferably from 20 to 45 weight percent, may also be used. These include, for example, polyisocyanates based on 4,4'-, 2,4'- and/or 2,2'-diphenylmethane diisocyanate and the corresponding isomeric mixtures; 2,4- and/or 2,6-toluenediisocyanate and the corresponding isomeric mixtures; mixtures of diphenylmethane diisocyanates and PMDI; and mixtures of toluene-diisocyanates and PMDI and/or diphenylmethane diisocyanates.

Suitable prepolymers for use as the polyisocyanate component of the formulations of the present invention include those having NCO contents of from 2 to 45 weight percent, more preferably from 4 to 40 weight percent. These prepolymers are prepared by reaction of the di- and/or polyisocyanates with materials including lower molecular weight diols and triols, but may alternatively be prepared with multivalent active hydrogen compounds, such as di- and tri-amines and di- and tri-thiols. Individual examples are aromatic polyisocyanates containing urethane groups, preferably having NCO contents of from 5 to 48 weight percent, more preferably 20 to 45 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 3000. These polyols may be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols may be used. Polyester polyols may also be used, as well as alkyl diols such as butane diol. Other useful diols may include bishydroxyethyl- and bishydroxypropyl-bisphenol A, cyclohexane dimethanol, and bishydroxyethyl hydroquinone.

Useful as the polyisocyanate component of useful prepolymer formulations are: (i) polyisocyanates having an NCO content of from 2 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 2 to 35 weight percent, based on the weight of the prepolymer, prepared by the reaction of polyols, having a functionality of preferably from 1.75 to 4 and a molecular weight of from 200 to 15,000, with 4,4'-diphenylmethane diisocyanate or with a mixture of 4,4'- and 2,4'-diphenylmethane diisocyanates; mixtures of (i) and (ii); and (iii) 2,4' and 2,6-toluene-diisocyanate and the corresponding isomeric mixtures.

PMDI in any of its forms is the most preferred polyisocyanate for use with the present invention. When used, it preferably has an equivalent weight between 125 and 300, more preferably from 130 to 175, and an average functionality of greater than about 1.5. More preferred is an average functionality of from 1.75 to 3.5. The viscosity of the polyisocyanate component is preferably from 25 to 5,000 centipoise (cP) (0.025 to about 5 pascal*seconds, Pa*s), but values from 50 to 1500 cP, at 25 degrees Celsius (° C.) (0.05 to 1.5 Pa*s) according to American Society for Testing and Materials (ASTM) standard D455, may be preferred for ease of processing. Similar viscosities are preferred where alternative polyisocyanate components are selected. In particular but non-limiting embodiments, the polyisocyanate component is selected from the group consisting of MDI, PMDI, an MDI prepolymer, a PMDI prepolymer, a modified MDI, and mixtures thereof.

The B-component (in the U.S.; called the A-component in Europe) of the foam-forming formulation is a polyol or polyol system which may comprise polyols that contain at least two reactive hydrogen atoms in a hydroxyl group. Such polyols may be polyether polyols or polyester polyols, may be aromatic, aliphatic, or a combination thereof, and may be prepared using any suitable initiator, such as an amine. The selected polyol or polyols generally have a functionality of from 2 to 8, preferably 2 to 6, and an average hydroxyl number preferably from about 18 to about 2000, more preferably from about 20 to about 1810. The polyol or polyols may have a viscosity at 25° C. of at least about 500 cP, In some embodiments, a higher viscosity, of at least about 2,000 cP, may be preferable. An upper viscosity limit may be dictated by practicality and spraying and/or spray-foaming equipment limitations, but for most purposes a polyol or polyol system viscosity of less than about 20,000 cP, and more typically less than about 15,000 cP, is generally suitable.

Non-limiting examples of the polyols which may be useful are polythio-ether-polyols, polyester-amides, and hydroxyl-containing polyacetals and hydroxyl-containing aliphatic polycarbonates. Other selections may include mixtures of at least two of the above-mentioned polyhydroxyl compounds, alternatively further including polyhydroxyl compounds having hydroxyl numbers of less than 100. A few non-limiting examples may include polyols based on styrene-acrylonitrile (SAN) copolymers, polyisocyanate-poly-addition (PIPA) copolymers, poly(hydroxyl-ethyl methacrylate-co-dimethylaminoethyl methacrylate) (PHD) copolymers, and the like.

Suitable polyester-polyols may be prepared from, for example, organic dicarboxylic acids having from about 2 to about 12 carbon atoms, preferably aromatic dicarboxylic acids having from 8 to 12 carbon atoms and polyhydric alcohols, preferably diols having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid and the isomeric naphthalene-dicarboxylic acids. The dicarboxylic acids may be used either individually or mixed with one another. The free dicarboxylic acids may also be replaced by the corresponding dicarboxylic acid derivatives, for example, dicarboxylic esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, respectively, and mixtures of phthalic acid and/or phthalic anhydride and adipic acid; mixtures of phthalic acid or phthalic anhydride, isophthalic acid and adipic acid or dicarboxylic acid; mixtures of succinic acid, glutaric acid and adipic acid; mixtures of terephthalic acid and adipic acid or dicarboxylic acid; and mixtures of succinic acid, glutaric acid and adipic acid. Examples of dihydric and polyhydric alcohols, in particular diols, include ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylol-propane. Preference may be given to ethanediol, diethylene glycol, 1,4-butanediol, 1,5-pentanediol, 1,6-hexanediol, and mixtures of at least two of said diols, and in particular, mixtures of 1,4-butanediol, 1,5-pentanediol and 1,6-hexanediol. Furthermore, polyester-polyols made from lactones, for example, ε-caprolactone, or from hydroxy-carboxylic acids, for example, ω-hydroxycaproic acid or hydrobenzoic acid, may also be employed.

The polyester-polyols may be prepared by polycondensing the organic, for example, aliphatic and preferably aromatic polycarboxylic acids and mixtures of aromatic and aliphatic polycarboxylic acids, and/or derivatives thereof, and polyhydric alcohols. This may be accomplished either without a catalyst or, preferably, with an esterification catalyst. An inert gas atmosphere, for example, nitrogen, carbon monoxide, helium, or argon, may facilitate preparation, which is effectively carried out in a melt phase at from about 150° C. to about 250° C., preferably from 180° C. to 220° C., and at atmospheric pressure or under reduced pressure, until the desired acid number, which is advantageously less than 10, preferably less than 2, is reached. In a preferred embodiment, the esterification mixture is polycondensed at the above-mentioned temperatures at atmospheric pressure and subsequently under a pressure of less than 500 millibar (mbar, 50 kilopascals, kPa), preferably from 50 to 150 mbar (5 to 15 kPa), until an acid number of from 80 to 30, preferably from 40 to 30, has been reached. Examples of suitable esterification catalysts are iron, cadmium, cobalt, lead, zinc, antimony, magnesium, titanium and tin in the form of metals, metal oxides or metal salts. However, the polycondensation may also be carried out in the liquid phase in the presence of diluents and/or entrainers, for example, benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1:1.8, preferably from 1:1.05 to 1:1.2. The polyester-polyols preferably have a functionality of from 2 to 5 and a hydroxyl number of from 20 to 600, and in particular, from 25 to 550.

Where polyether-polyols are selected, such may be prepared by known processes. For example, anionic polymerization, using alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8, preferably 3 to 8, reactive hydrogen atoms in bound form, may be employed. Alternatively, such may be prepared by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Non-limiting examples of suitable alkylene oxides are tetrahydrofuran, 1,3-propylene oxide, 1,2- and 2,3-butylene oxide, styrene oxide and, preferably, ethylene oxide and 1,2-propylene oxide. The alkylene oxides may be used individually, alternatively one after the other, or as mixtures. Examples of suitable initiator molecules are water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylene-tetramine, 1,3-propylene-diamine, 1,3- and 1,4-butylene-diamine, 1,2-, 1,3-, 1,4-, 1,5- and 1,6-hexamethylene-diamine, aniline, phenylenediamines, 2,3-, 2,4-, 3,4- and 2,6-tolylene-diamine, and 4,4'-, 2,4'- and 2,2'-diaminodiphenylmethane.

Other suitable initiator molecules are alkanolamines, for example, ethanol-amine, N-methyl- and N-ethylethanolamine; dialkanolamines, for example, diethanolamine, Nmethyl- and N-ethyldiethanolamine, and trialkanolamines, for example, triethanolamine and ammonia; and polyhydric alcohols, in particular dihydric and/or trihydric alcohols, such as ethanediol, 1,2- and 1,3-propanediol, diethylene glycol, dipropylene glycol, 1,4-butane-diol, 1,6-hexanediol, glycerol, trimethylolpropane, pentaerythritol, sorbitol and sucrose, polyhydric phenols, for example, 4,4'-dihydroxy-diphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

It is advantageous, in some non-limiting embodiments, that the polyols are polyether-polyols having a functionality of from 2 to 8 and a hydroxyl number of from 100 to 850, prepared by anionic polyaddition of at least one alkylene oxide, preferably ethylene oxide or 1,2-propylene oxide or 1,2-propylene oxide and ethylene oxide, onto, as an initiator molecule, at least one aromatic compound containing at least two reactive hydrogen atoms and also at least one hydroxyl, amino and/or carboxyl group. Examples of such initiator molecules are aromatic polycarboxylic acids, for example, hemimellitic acid, trimellitic acid, trimesic acid and preferably phthalic acid, isophthalic acid and terephthalic acid; mixtures of at least two of the polycarboxylic acids; and hydroxycarboxylic acids, for example, salicylic acid, p- and m-hydroxybenzoic acid and gallic acid. Aminocarboxylic acids, for example, anthranilic acid, m- and p-aminobenzoic acid, may be used, as well as polyphenols, for example, resorcinol, and preferably dihydroxydiphenylmethanes and dihydroxy-2,2-diphenylpropanes. Other possibilities include Mannich condensates of phenols, formaldehyde and dialkanolamines, preferably diethanolamine. Also preferred are aromatic polyamines, for example, 1,2-, 1,3- and 1,4-phenylenediamine and, in particular, 2,3-, 2,4-, 3,4- and 2,6-tolylenediamine, 4,4'-, 2,4'- and 2,2'-diamino-diphenylmethane, polyphenyl-polymethylene-polyamines, mixtures of diamino-diphenylmethanes and polyphenyl-polymethylene-polyamines, as formed, for example, by condensation of aniline with formaldehyde, and mixtures of at least two of said polyamines.

The preparation of polyether-polyols using at least difunctional aromatic initiator molecules of this type is known and described in, for example, DD-A-290 201; DD-A-290 202; DE-A-34 12 082; DE-A-4 232 970; and GB-A-2,187,449. The polyether-polyols preferably have a functionality of from 3 to 8, in particular from 3 to 7, and hydroxyl numbers of from 120 to 770, in particular from 200 to 650.

Other suitable polyether-polyols are melamine/polyether-polyol dispersions as described in, e.g., EP-A-23 987 (U.S. Pat. No. 4,293,657); polymer/polyether-polyol dispersions prepared from polyepoxides and epoxy resin curing agents in the presence of polyether-polyols, as described in, e.g., DE 29 43 689 (U.S. Pat. No. 4,305,861); dispersions of aromatic polyesters in polyhydroxyl compounds, as described in, e.g., EP-A-62 204 (U.S. Pat. No. 4,435,537) and DE-A 33 00 474; dispersions of organic and/or inorganic fillers in polyhydroxyl compounds, as described in, e.g., EP-A-11 751 (U.S. Pat. No. 4,243,755); polyurea/polyether-polyol dispersions, as described in, e.g., DE-A-31 25 402; tris(hydroxyalkyl) isocyanurate/polyether-polyol dispersions, as described in, e.g., EP-A-136 571 (U.S. Pat. No. 4,514,426); and crystallite suspensions, as described in, e.g., DE-A-33 42 176 and DE-A-33 42 177 (U.S. Pat. No. 4,560,708). Other types of dispersions that may be useful in the present invention include those wherein nucleating agents, such as liquid perfluoroalkanes and hydrofluoroethers, and inorganic solids, such as unmodified, partially modified and modified clays, including, for example, spherical silicates and aluminates, flat laponites, montmorillonites and vermiculites, and particles comprising edge surfaces, such as sepiolites and kaolinite-silicas, are included. Organic and inorganic pigments and compatibilizers, such as titanates and siliconates, may also be included in useful polyol dispersions.

Like the polyester-polyols, the polyether-polyols may be used individually or in the form of mixtures. Furthermore, they may be mixed with the graft polyether-polyols or polyester-polyols and the hydroxyl-containing polyester-amides, polyacetals, polycarbonates and/or phenolic polyols. Examples of suitable hydroxyl-containing polyacetals are the compounds which may be prepared from glycols, such as diethylene glycol, triethylene glycol, 4,4'-dihydroxy-ethoxydiphenyldimethylmethane, hexanediol, and formaldehyde. Suitable polyacetals may also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, for example, diphenyl carbonate or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable compounds containing at least two reactive hydrogen atoms are furthermore phenolic and halogenated phenolic polyols, for example, resol-polyols containing benzyl ether groups. Resol-polyols of this type can be prepared, for example, from phenol, formaldehyde, expediently paraformaldehyde, and polyhydric aliphatic alcohols. Such are described in, e.g., EP-A-0 116 308 and EP-A-0 116 310.

In certain preferred embodiments, the polyols may include a mixture of polyether-polyols containing at least one polyether-polyol based on an aromatic, polyfunctional initiator molecule and at least one polyether-polyol based on a non-aromatic initiator molecule, preferably a trihydric to octahydric alcohol.

The formulation of the invention may also include at least one physical or chemical blowing agent, which is intended to foam the flexible polyurethane foam layer and, in some embodiments, the polyurethane heavy layer. This is generally considered to be part of the B-component, though is not necessarily incorporated therein prior to contact between the A-component and B-component. Water may be used as a blowing agent, generally in an amount not exceeding about 10 percent, based on the weight of the polyol or polyol system described hereinabove. Limitation of the amount of water may serve to reduce the overall exotherm of the foam-forming reaction, while at the same time enhancing the mechanical properties of the foam and its dimensional stability at low temperatures.

Among possible selections for a blowing agent are cycloalkanes including, in particular, cyclopentane, cyclohexane, and mixtures thereof; other cycloalkanes having a maximum of 4 carbon atoms; dialkyl ethers, cycloalkylene ethers, and fluoroalkanes; and mixtures thereof. Specific examples of alkanes include, inter alia, propane, n-butane, isobutane, isopentane, and technical-grade pentane mixtures; cycloalkanes, for example, cyclobutane; dialkyl ethers, for example, dimethyl ether, methyl ethyl ether, methyl butyl ether and diethyl ether; cycloalkylene ethers, for example, furan; and fluoroalkanes, which are believed to be broken down in the troposphere and therefore are presently assumed to not damage the ozone layer. The fluoroalkanes include, but are not limited to, trifluoromethane, difluoromethane, difluoroethane, tetrafluoroethane, and hepta-fluoropropane. Also useful are chemical blowing agents such as carbamates and carbamate adducts, such as are described in, e.g., U.S. Pat. Nos. 5,789,451 and 5,859,285.

The blowing agents may, as noted hereinabove, be used alone or, preferably, in combination with water. The following combinations have proven highly successful and are therefore preferred: water and cyclopentane; water and cyclopentane or cyclohexane; mixtures of cyclohexane and at least one compound from the group consisting of n-butane, isobutane, n- and isopentane, technical-grade pentane mixtures, cyclobutane, methyl butyl ether, diethyl ether, furan, trifluoromethane, difluoromethane, difluoroethane, tetrafluoroethane, and/or hepta-fluoropropane; water and carbamate adducts; and carbamate adducts with one or more fluoroalkanes and or dialkyl ethers. In particularly preferred embodiments, it is found that including at least one low-boiling compound therein, preferably having a boiling point below about 40° C., which is homogeneously miscible with cyclopentane or cyclohexane, wherein either or these or a mixture thereof is being used, may improve a foam's properties and/or its processability. In particular embodiments the blowing agent, or mixture of blowing agents, desirably has a boiling point that is below about 50° C., and preferably from about 0° C. to about 30° C. Such blowing agents are also described in, e.g., EP-A-0 421 269 (U.S. Pat. No. 5,096,933).

The sound- and vibration-dampening polyurethane formulations may optionally include further additives or modifiers such as are well-known in the art. For example, surfactants, catalysts, and/or flame retardants may be included. Exemplary thereof are amine catalysts, including any organic compound that contains at least one tertiary nitrogen atom and that is capable of catalyzing the hydroxyl/isocyanate reaction between the A-component and B-component may be used. Typical classes of amines include the N-alkylmorpholines, N-alkyl-alkanolamines, N,N-dialkyl-cyclohexylamines, and alkylamines where the alkyl groups are methyl, ethyl, propyl, butyl or isomeric forms thereof, and heterocyclic amines. Typical but non-limiting thereof are triethylenediamine, tetramethylethylenediamine, bis(2-dimethylaminoethyl)ether, triethylamine, tripropylamine, tributylamine, triamylamine, pyridine, quinoline, dimethyl-piperazine, piperazine, N,N-dimethylcyclohexylamine, N-ethylmorpholine, 2-methylpropanediamine, methyltriethylene-diamine, 2,4,6-tri-dimethylaminomethyl)phenol, N,N',N"-tris(dimethylamino-propyl)-sym-hexahydrotriaz-ine, and mixtures thereof. A preferred group of tertiary amines comprises bis(2-dimethyl-aminoethyl)ether, dimethylcyclohexylamine, N,N-dimethylethanolamine, triethylenediamine, triethylamine, 2,4,6-tri(dimethylaminomethyl) phenol, N,N',N-ethyl-morpholine, and mixtures thereof.

One or more non-amine catalysts may also be used in the present invention. Typical of such catalysts are organometallic compounds of bismuth, lead, tin, titanium, iron, antimony, uranium, cadmium, cobalt, thorium, aluminum, mercury, zinc, nickel, cesium, molybdenum, vanadium, copper, manganese, zirconium, and combinations thereof. Included among illustrative examples are bismuth nitrate, lead 2-ethylhexoate, lead benzoate, lead naphthenate, ferric chloride, antimony trichloride, and antimony glycolate. A preferred organo-tin catalyst may be selected from the stannous salts of carboxylic acids, such as stannous acetate, stannous octoate, stannous 2-ethylhexoate, 1-methylimidazole, and stannous laurate, as well as the dialkyl-tin salts of carboxylic acids, such as dibutyl tin diacetate, dibutyl tin dilaurate, dibutyl tin dimaleate, dioctyl tin diacetate, combinations thereof, and the like.

One or more trimerization catalysts may be used with the present invention. The trimerization catalyst employed may be any known to those skilled in the art which will catalyze the trimerization of an organic isocyanate compound to form the isocyanurate moiety. For typical isocyanate trimerization catalysts, see, e.g., *The Journal of Cellular Plastics*, November/December 1975, page 329: and U.S. Pat. Nos. 3,745,133; 3,896,052; 3,899,443; 3,903,018; 3,954,684 and 4,101,465. Typical trimerization catalysts include the glycine salts and tertiary amine trimerization catalysts and alkali metal carboxylic acid salts and mixtures of the various types of catalysts. Preferred species within these classes are sodium N-2-(hydroxy-5-nonylphenyl) methyl-N-methyl-glycinate, N,N-dimethylcyclohexylamine, and mixtures thereof. Also included among preferred catalyst components are the epoxides.

Other additives which may be particularly useful with the present invention are one or more brominated or non-brominated flame retardants. These flame retardants may serve to inhibit the ignition of combustible organic materials, and may also hinder the spread of fire, that is, the time to flashover, thereby providing valuable extra time in the early stages of a fire, during which escape may be possible. In some non-limiting embodiments a brominated polyol having a relatively high viscosity, ranging from about 20,000 cP to about 200,000 cP, and in other embodiments, from about 100,000 cP to about 180,000 cP, may be selected. A suitable flame retardant may be selected from the group consisting of decabromodiphenyl ether (decaBDE) and other polybrominated diphenyl ethers (PBDEs), including, for example, pentabromodiphenyl ether (pentaBDE), octabromodiphenyl ether (octaBDE), tetrabromobisphenol A (TBBPA or TBBP-A), hexabromocyclododecane (HBCD), and combinations thereof. Also included are the brominated organophosphates, such as tris(2,3-dibromopropyl) phosphate (TRIS), bis(2,3-dibromopropyl) phosphate, combinations thereof, and the like. Non-brominated flame retardants include, for example, tris(2-chloroethyl)phosphate, tris(2-chloropropyl)-phosphate, tris(1,3-dichloropropyl)-phosphate, diammonium phosphate, various halogen-ated aromatic compounds, antimony oxide, alumina trihydrate, polyvinyl chloride, and mixtures thereof.

Dispersing agents, cell stabilizers, and surfactants may also be incorporated into the formulations. Surfactants, including organic surfactants and silicone-based surfactants, may be added as cell stabilizers. Some representative materials are sold under the designations SF-1109, L-520, L-521 and DC-193, which are, generally, polysiloxane polyoxyalkylene block copolymers, such as those disclosed in, e.g., U.S. Pat. Nos. 2,834,748; 2,917,480; and 2,846,458. Also included are organic surfactants containing polyoxy-ethylene-polyoxybutylene block copolymers, such as are described in, e.g., U.S. Pat. No. 5,600,019. Other additives, such as carbon black and colorants, may also be included in the polyurethane formulations. Finally, water or moisture scavengers, such as those based upon or comprising carbodiimides, oxazolidines (ketone and aldehyde types), alkoxysilanes, certain isocyanates such as tosyl isocyanate, and calcium sulfate, as well as certain zeolites and other molecular sieves in general, frequently in a form such as a dispersion in an oil such as castor oil (for example, BAYLITH™ L paste, available from Bayer Corporation), and the like, may also be employed. In certain embodiments these scavengers may be helpful in ensuring a desired density, or achieving full density, in the polyurethane heavy layer in particular.

The polyurethane foams formed by the present process offer in many embodiments the advantage of voids that are at least 10 percent fewer in number, at least 10 percent smaller in average diameter, or a combination thereof, when compared with polyurethanes formed under identical conditions but without the modified inner surface or liner inner surface as described hereinabove. In some embodiments significantly greater improvements may be attained.

It is noted that in one particular embodiment the improved process may be used in conjunction with vacuum assisted injection (VAI) methods, such as for making household appliances including but not limited to refrigerators, freezers and the like. This method is characterized in that the reaction mixture is injected into a closed mold cavity which is at a reduced pressure. The mold pressure is typically reduced to from 300 millibar (mbar) to 950 mbar (from 30 kPa to 95 kPa), preferably from 400 mbar to 900 mbar (from 40 kPa to 90 kPa) and even more preferably from 500 mbar to 850 mbar (from 50 kPa to 85 kPa), before or immediately after the foam forming composition is charged to the mold. Furthermore, the packing factor (ratio of the density of the molded foam divided by its free rise density) may typically range from 1.03 to 1.9. General information regarding VAI may be found in, for example, WO 2007/058793 and WO 2010/044361,

EXAMPLES

Components Used in the Examples and Comparative Examples

Isocyanate:
Voratec SD 100: A polymeric MDI with an NCO content of approximately 31%, commercially available from The Dow Chemical Company.
Polyol Formulation:
DSD 426.01: A formulated polyol with a hydroxyl number of 389 mg KOH/g, a viscosity at 25° C. of 6500 mPa·s and a water content of 2.4%, commercially available from The Dow Chemical Company.
DSV 1103.01: A formulated polyol with a hydroxyl number of 410 mg KOH/g, a viscosity at 25° C. of 13000 mPa·s and a water content of 1.4%, commercially available from The Dow Chemical Company.
Cyclopentane: 95% cyclopentane available from Halterman.
Properties Determined:
Free Rise Density: The density measured from a 100× 100×100 mm block obtained from the center of a free-rising foam (at ambient air pressure) produced from a total system formulation weight of 200 grams (g) or more. FRD is reported in (kilograms per cubic meter, kg/m$^3$) and is measured according to ASTM 1622-88.
Foam Reactivity: The foam reactivity is determined on free-rise foams, using a 20×20×20 cm mold, with a shot-weight of 200 grams. From these foams, made at ambient pressure, cream time, gel time and tack-free time are determined.
Cream time: The time lapse in seconds (s) from the beginning of the mixing process until a visual change of the reactants (cloudiness and/or color change) occurs.
Gel time: The lapse of time in seconds (s) from the beginning of the mixing process until a string can be pulled from the rising foam using a probe similar to a tongue depressor.
Tack-free time: The lapse of time in seconds (s) from the beginning of the mixing process until the top foam surface is no longer sticky.
Filling time: The time lapse in seconds (s) from the beginning of the mixing process until the foam reaches the top edge of the mold, when it is completely filled.
Viscosity: Polyol Formulation viscosity, without the blowing agent, as measured according to ASTM D445 in mPa·s or cP at 25° C.
Minimum Fill Weight: MFW is the minimum amount of foam needed to fill the insulation housing unit in grams (g).
Minimum Fill Density: The density determined from the minimum weight needed to fill the mold completely and the volume of this mold. MFD is reported in kg/m$^3$. The minimum fill density is an indication of the ability to fill the mold or cavity
Molded Density: The real measured injected weight of the foam divided by the volume of the cavity. In case of a refrigerator/freezer cabinet the empty housing is weighed prior to the foaming process and after injection of the foam the weight is determined again. The difference between the two results is the real injected foam weight, which, when divided by the volume of the cavity, results in the molded density of the foam in the cabinet. The molded density is reported in kg/m$^3$.

Overpack: The overpack is defined as [Molded density× 100/Minimum Fill Density]. Overpack is reported in percent and has a typical value of 5-35 percent in excess of 100 percent, depending on the applied in-mold pressure.

Pressure: Pressure is the air pressure inside the mold cavity prior to and during foaming, reported in absolute pressure, with the unit bar.

Examples 1-4 and Comparative Examples A to G

In total eleven (11) foams are prepared using the formulation amounts shown in Tables 1-4, with all amounts given in parts by weight unless stated otherwise in the table. A high pressure Cannon™ machine equipped with a mix-head is attached to a mold injection hole, at ambient pressures (0.95 bar) unless stated otherwise. The polyol component and additional formulation components are premixed and then injected, simultaneously with the isocyanate component, into a Brett mold at a mix-head pressure of at least 100 bar (10 megapascal, mPa). The temperature of the components is kept at 20° C.+/−2° C. The output of the machine is typically from about 150 to about 250 grams per second (g/s). The Brett mold is made of aluminum with a tempered glass lid with dimensions of 200×20×5 centimeters (cm), which allows creation of a reduced atmospheric pressure in the mold during foaming.

An hourglass Brett (HGB) mold is also used in certain experiments, as shown in the following tables. In these runs smooth inserts are added at the sides of the mold, creating a narrow channel in the middle of the Brett through which the foam needs to flow. The result is that the additional shear forces on the foam tend to increase the number of voids forming, for experimental purposes. These additional smooth aluminum inserts, having dimensions of 32×5×5 cm, are placed 1 meter high in the Brett mold, and mounted onto the side-wall. The internal pressure of the mold is controlled via a pipe connected to a 500 liter (L) buffer tank that is connected to a medium capacity vacuum pump (1500 liters per minute, L/min). The vacuum in the buffer tank, and thus the in-mold air pressure, is maintained with control valves.

The foams produced in this Brett mold are typically used to measure thermal conductivity (also termed "lambda"), compression strength, molded density, and density distribution. In this specific case, the foam voids are determined from the last top 50 cm of the Brett mold, on the bottom and top side of the foam. From this last 50 cm of the Brett mold, two (2) layers of foam of 2.5 mm thick are cut on each side (top and bottom) for determination of the voids. The number of voids in each (top=T, bottom=B, with "1" and "2" representing each of the two layers cut), as well as the surface area covered is depicted in the tables hereinbelow. The temperature of the mold is about 45° C. Typical demold-time of the foams is in the range of from about 6 to about 10 minutes. A release agent is applied to the mold prior to filling in order to facilitate demolding.

Foams are made under four different conditions, as designated in the tables herein below: (a) without liners; (b) with a HIPS (high impact polystyrene) liner without profile (smooth); (c) with a HIPS liner with profile (thickness 0.2 mm); and (d) with a mesh, with a thickness 0.15 mm and pores of 2 mm squared (mm$^2$) area. These examples and comparatives illustrate the effects of each on the formation of voids in the foams.

TABLE 1

| Experiment - Brett | Comparative Example A | Comparative Example B | Example 1 |
|---|---|---|---|
| DSD 426.01 (pbw) | | 100 | |
| Cyclopentane (pbw) | | 15 | |
| Voratec SD 100 ISO (pbw) | | 148 | |
| Cream time (s) | | 3 | |
| Gel time (s) | | 32 | |
| Tack-free time (s) | | 51 | |
| Free rise density (kg/m3) | | 21.6 | |
| Liner | No Liner | HIPS/smooth | HIPS/profiled |
| Molded density | 32.0 | 32.3 | 32.1 |
| Filling time | 25 | 27 | 27 |
| Overpack | 110 | 110 | 110 |
| Foam Defect Analysis | | | |
| T1-count | 18 | 28 | 18 |
| T1-% | 1.93 | 6.20 | 1.80 |
| B1-count | 21 | 16 | 16 |
| B1-% | 3.85 | 2.76 | 1.62 |
| Layer-1 sum count | 39 | 44 | 34 |
| Layer-1 sum % | 2.89 | 4.48 | 1.71 |
| T2-count | 16 | 24 | 16 |
| T2-% | 1.29 | 1.79 | 1.55 |
| B2-count | 17 | 13 | 17 |
| B2-% | 3.25 | 1.33 | 0.63 |
| Layer-2 sum count | 33 | 37 | 33 |
| Layer-2 sum % | 2.27 | 1.56 | 1.09 |
| Average foam defect area % | 2.6 | 3.0 | 1.4 |

TABLE 2

| Experiment - HGB (??) | Comparative Example C | Example 2 |
|---|---|---|
| DSD 426.01 (pbw) | | 100 |
| Cyclopentane (pbw) | | 15 |
| Voratec SD 100 ISO (pbw) | | 148 |
| Cream time (s) | | 3 |
| Gel time (s) | | 32 |
| Tack-free time (s) | | 51 |
| Free rise density (kg/m$^3$) | | 21.6 |
| Liner | HIPS/smooth | HIPS/profiled |
| Molded density | 32.0 | 32.3 |
| Filling time | 35 | 35 |
| Overpack | 110 | 110 |
| Foam Defect Analysis | | |
| T1-count | 8 | 2 |
| T1-% | 0.49 | 0.03 |
| B1-count | 13 | 3 |
| B1-% | 1.27 | 0.09 |
| Layer-1 sum count | 21 | 5 |
| Layer-1 sum % | 0.88 | 0.06 |
| T2-count | 6 | 0 |
| T2-% | 1.04 | 0 |
| B2-count | 8 | 3 |
| B2-% | 0.62 | 0.04 |
| Layer-2 sum count | 14 | 3 |
| Layer-2 sum % | 0.83 | 0.02 |
| Average foam defect area % | 0.85 | 0.04 |

TABLE 3

| Experiment - Brett | Comparative Example D | Comparative Example E | Example 3 |
|---|---|---|---|
| DSV 1103.01 (pbw) | | 100 | |
| Cyclopentane (pbw) | | 16 | |
| Voratec SD 100 ISO (pbw) | | 138 | |
| Cream time (s) | | 2 | |
| Gel time (s) | | 16 | |
| Tack-free time (s) | | 17 | |

TABLE 3-continued

| Experiment - Brett | Comparative Example D | Comparative Example E | Example 3 |
|---|---|---|---|
| Free rise density (kg/m³) | | 22.8 | |
| In-mold pressure (bar) | | 0.95 | |
| Liner | No Liner | HIPS/smooth | HIPS/profiled |
| Molded density | 37.3 | 37.2 | 37.5 |
| Filling time | 14 | 14 | 14 |
| Overpack | 110 | 110 | 110 |
| Foam Defect Analysis | | | |
| T1-count | 12 | 14 | 5 |
| T1-% | 1.22 | 2.00 | 0.63 |
| B1-count | 7 | 18 | 9 |
| B1-% | 3.06 | 4.15 | 2.01 |
| Layer-1 sum count | 19 | 32 | 14 |
| Layer-1 sum % | 2.14 | 3.08 | 1.32 |
| T2-count | 8 | 9 | 3 |
| T2-% | 0.62 | 0.64 | 0.43 |
| B2-count | 3 | 8 | 4 |
| B2-% | 1.55 | 0.80 | 0.54 |
| Layer-2 sum count | 11 | 17 | 7 |
| Layer-2 sum % | 1.09 | 0.72 | 0.49 |
| Average foam defect area % | 1.6 | 1.9 | 0.9 |

TABLE 4

| Experiment - Brett | Comparative Example F | Example 4 | Example 5 |
|---|---|---|---|
| DSV 1103.01 (pbw) | | 100 | |
| Cyclopentane (pbw) | | 16 | |
| Voratec SD 100 ISO (pbw) | | 138 | |
| Cream time (s) | | 2 | |
| Gel time (s) | | 16 | |
| Tack-free time (s) | | 17 | |
| Free rise density (kg/m³) | | 22.8 | |
| In-mold pressure (bar) | | 0.7 | |
| Liner | HIPS/smooth | HIPS/profiled | Mesh Liner |
| Molded density | 33.4 | 33.5 | 33.5 |
| Filling time | 11 | 11 | 11 |
| Overpack | 115 | 115 | 115 |
| Foam Defect Analysis | | | |
| T1-count | 11 | 5 | 3 |
| T1-% | 1.03 | 0.92 | 0.58 |
| B1-count | 7 | 4 | 0 |
| B1-% | 1.73 | 0.72 | 0 |
| Layer-1 sum count | 18 | 9 | 3 |
| Layer-1 sum % | 1.38 | 0.82 | 0.29 |
| T2-count | 15 | 7 | 3 |
| T2-% | 0.62 | 0.12 | 0.34 |
| B2-count | 7 | 2 | 0 |
| B2-% | 0.27 | 0.14 | 0 |
| Layer-2 sum count | 22 | 9 | 3 |
| Layer-2 sum % | 0.45 | 0.13 | 0.17 |
| Average foam defect area % | 0.9 | 0.5 | 0.2 |

What is claimed is:

1. A method of reducing the number or size of voids in a polyurethane formed in situ in a container, comprising forming a flow of at least two reactive polyurethane formulation components from a component source such that at least a portion of the flow contacts an inner surface of a liner of the container, the inner surface being
   (1) modified over at least 25 percent thereof by either (a) profiling features, said profiling features each having an average height-to-surface measurement ranging from 0.5 mm to 20 mm; or (b) engraving features, said engraving features having a depth-to-surface measurement ranging from 0.1 mm to 0.3 mm; the profiling or engraving features being repeated at intervals that range from 2 to 5 times the height-to-surface or depth-to-surface measurement, respectively; wherein an added surface area of the inner surface of the liner is at least 25 percent greater as compared to a smooth inner liner without the profiling features or the engraving features; or
   (2) a mesh or having a mesh interposed between the inner surface and the component source, wherein the mesh has an average pore diameter ranging from 1 mm to 40 mm;
   under conditions such that a polyurethane is formed, the polyurethane having fewer or smaller voids than a polyurethane formed under identical conditions but without a modified inner surface.

2. The method of claim 1, wherein the inner surface is modified over at least 30 percent thereof by either the (a) profiling features or the (b) engraving features.

3. The method of claim 2, wherein the polyurethane has voids that are (1) at least 10 percent fewer; (2) at least 10 percent smaller in diameter; or (3) a combination thereof; than a polyurethane formed under identical conditions but without the modified inner surface.

4. The method of claim 1, wherein the inner surface is modified over at least 80 percent thereof by either the (a) profiling features or the (b) engraving features.

5. The method of claim 4, wherein the profile features have an average height-to-surface measurement that ranges from 1 mm to 10 mm.

6. The method of claim 1, wherein the inner surface of the liner is modified by either the profiling features or the engraving features.

7. The method of claim 6, wherein at least 40 percent of a total area of the inner surface is covered with profile features that correspond to the profiling features or the engraving features.

8. The method of claim 6, wherein an added surface area of the inner surface of the liner is at least 50 percent greater as compared to a smooth inner liner without the profiling features or the engraving features.

9. The method of claim 6, wherein an added surface area of the inner surface of the liner is at least 80 percent greater as compared to a smooth inner liner without the profiling features or the engraving features.

10. The method of claim 1, wherein the liner is a high impact polystyrene liner with profiling features.

11. The method of claim 1, further comprising using a vacuum assisted injection method that includes injecting the component source into a closed mold cavity of the container that is at a reduced pressure from 300 mbar to 950 mbar, the container being a household appliance.

12. An improvement in a method to form a polyurethane in situ in a container, wherein a flow of at least two reactive polyurethane formulation components into a container with an inner surface is initiated and the components react to form the polyurethane in the container, and wherein the flow exhibits dynamics that include shear forces resulting from the interaction of the flow and the inner surface, and wherein the polyurethane formed in the container from the formulation exhibits undesirable voids therein, the improvement comprising reducing the shear forces resulting from the interaction of the flow and the inner surface by (1) by inserting a liner having a modified inner surface into the container, such that the modification increases the area of the liner inner surface of the container contacting the formulation by a factor of at least 25 percent compared to that of an otherwise identical container having an unmodified inner surface; or (2) wherein the liner is a mesh interposed between the inner surface and the component source, wherein the mesh has an average pore diameter ranging from 1 mm to 40 mm; such that the polyurethane exhibits voids that are fewer in number or smaller in average diameter, or both, than voids in a polyurethane formed identically but without the modified inner container or liner surface.

13. The improvement of claim 12, wherein the modification increases the area of the inner surface by a factor of at least 50 percent.

14. The improvement of claim 12, wherein the voids are decreased in number, size or both by at least 10 percent.

15. The improvement of claim 12, wherein the polyurethane has voids that are (1) at least 10 percent fewer; (2) at least 10 percent smaller in diameter; or (3) a combination thereof; than a polyurethane formed under identical conditions but without the modified inner surface.

* * * * *